(12) United States Patent
Bentley et al.

(10) Patent No.: US 9,922,369 B2
(45) Date of Patent: Mar. 20, 2018

(54) TRANSACTION ACCOUNT INTERFACE

(71) Applicant: III HOLDINGS 1, LLC, Wilmington, DE (US)

(72) Inventors: Simon R. Bentley, East Sussex (GB); Deborah Louise Craft, Brooklyn, NY (US); Melanie Anne Dunn, New York, NY (US); Adeyemi O. Kayode, Litchfield Park, AZ (US); Chintan M. Mehta, Phoenix, AZ (US); Denis George Perracchio, Peoria, AZ (US); Sejal Dilip Vora, New York, NY (US)

(73) Assignee: III Holdings 1, LLC, Wilmington, DE (US)

( * ) Notice: Subject to any disclaimer, the term of this patent is extended or adjusted under 35 U.S.C. 154(b) by 177 days.

(21) Appl. No.: 14/336,658

(22) Filed: Jul. 21, 2014

(65) Prior Publication Data
US 2014/0379542 A1 Dec. 25, 2014

Related U.S. Application Data

(63) Continuation of application No. 11/275,066, filed on Dec. 7, 2005, now Pat. No. 8,788,376.

(51) Int. Cl.
*G06Q 20/02* (2012.01)
*G06Q 30/02* (2012.01)
(Continued)

(52) U.S. Cl.
CPC ............. *G06Q 40/00* (2013.01); *G06Q 20/02* (2013.01); *G06Q 30/00* (2013.01); *G06Q 30/02* (2013.01); *G06Q 50/188* (2013.01)

(58) Field of Classification Search
CPC .............................. G06Q 30/02; G06Q 20/02
(Continued)

(56) References Cited

U.S. PATENT DOCUMENTS 4,694,397 A 9/1987 Grant et al.
4,751,640 A 6/1988 Lucas et al.
(Continued)

OTHER PUBLICATIONS

Jin W. Chang, et al., "Agent-based workflow: TRP support environment (TSE)," Computer Networks and ISDN Systems, 28, 1996, pp. 1501-1511.
(Continued)

*Primary Examiner* — Jessica Lemieux
(74) *Attorney, Agent, or Firm* — Meyertons, Hood, Kivlin, Kowert & Goetzel, P.C.

(57) ABSTRACT

A system, method and computer program product for interfacing disparate partner systems to a transaction account issuer system is disclosed. A Web server receives a request from a disparate partner system, such as a Web service, a portal and/or a partner microsite and an application server extracts a partner identifier from the request. In turn, a delegate engine delegates actions corresponding to the request to one or more handlers using predetermined rules associated with the partner identifier. A worker manager manages worker code blocks which perform the actions based on a subset of the predetermined rules associated with the partner identifier. The Web server then communicates an outcome to the partner system based on the actions performed by the worker code blocks.

10 Claims, 4 Drawing Sheets

(51) Int. Cl.
*G06Q 40/00* (2012.01)
*G06Q 30/00* (2012.01)
*G06Q 50/18* (2012.01)

(58) Field of Classification Search
USPC .......................................................... 705/35
See application file for complete search history.

(56) References Cited

U.S. PATENT DOCUMENTS

| | | | |
|---|---|---|---|
| 4,823,265 | A | 4/1989 | Nelson |
| 4,992,940 | A | 2/1991 | Dworkin |
| 5,220,501 | A | 6/1993 | Lawlor et al. |
| 5,239,462 | A | 8/1993 | Jones et al. |
| 5,262,942 | A | 11/1993 | Earle |
| 5,274,547 | A | 12/1993 | Zoffel et al. |
| 5,463,555 | A | 10/1995 | Ward et al. |
| 5,611,052 | A | 3/1997 | Dykstra et al. |
| 5,615,408 | A | 3/1997 | Johnson et al. |
| 5,677,955 | A | 10/1997 | Doggett et al. |
| 5,694,551 | A | 12/1997 | Doyle et al. |
| 5,696,907 | A | 12/1997 | Tom |
| 5,706,442 | A | 1/1998 | Anderson et al. |
| 5,710,889 | A | 1/1998 | Clark et al. |
| 5,745,706 | A | 4/1998 | Wolfberg et al. |
| 5,758,327 | A | 5/1998 | Gardner et al. |
| 5,758,329 | A | 5/1998 | Wojcik et al. |
| 5,765,142 | A | 6/1998 | Allred et al. |
| 5,774,882 | A | 6/1998 | Keen et al. |
| 5,787,404 | A | 7/1998 | Fernandez-Holmann |
| 5,797,133 | A | 8/1998 | Jones et al. |
| 5,842,178 | A | 11/1998 | Giovannoli |
| 5,866,889 | A | 2/1999 | Weiss et al. |
| 5,870,721 | A | 2/1999 | Norris |
| 5,878,403 | A | 3/1999 | DeFrancesco et al. |
| 5,890,140 | A | 3/1999 | Clark et al. |
| 5,893,076 | A | 4/1999 | Hafner et al. |
| 5,899,982 | A | 5/1999 | Randle |
| 5,913,202 | A | 6/1999 | Motoyama |
| 5,918,217 | A | 6/1999 | Maggioncalda et al. |
| 5,930,776 | A | 7/1999 | Dykstra et al. |
| 5,950,179 | A | 9/1999 | Buchanan et al. |
| 5,970,475 | A | 10/1999 | Barnes et al. |
| 5,970,476 | A | 10/1999 | Fahey |
| 5,974,395 | A | 10/1999 | Bellini et al. |
| 5,991,750 | A | 11/1999 | Watson |
| 6,009,406 | A | 12/1999 | Nick |
| 6,014,644 | A | 1/2000 | Erickson |
| 6,014,645 | A | 1/2000 | Cunningham |
| 6,018,723 | A | 1/2000 | Siegel et al. |
| 6,029,147 | A | 2/2000 | Horadan et al. |
| 6,029,149 | A | 2/2000 | Dykstra et al. |
| 6,032,184 | A | 2/2000 | Cogger et al. |
| 6,044,354 | A | 3/2000 | Asplen, Jr. |
| 6,055,516 | A | 4/2000 | Johnson et al. |
| 6,064,986 | A | 5/2000 | Edelman |
| 6,070,142 | A | 5/2000 | McDonough et al. |
| 6,088,686 | A | 7/2000 | Walker et al. |
| 6,105,007 | A | 8/2000 | Norris |
| 6,112,190 | A | 8/2000 | Fletcher et al. |
| 6,115,690 | A | 9/2000 | Wong |
| 6,119,104 | A | 9/2000 | Brumbelow et al. |
| 6,125,391 | A | 9/2000 | Meltzer et al. |
| 6,128,602 | A | 10/2000 | Northington et al. |
| 6,128,624 | A | 10/2000 | Papierniak et al. |
| 6,131,810 | A | 10/2000 | Weiss et al. |
| 6,135,349 | A | 10/2000 | Zirkel |
| 6,141,647 | A | 10/2000 | Meijer et al. |
| 6,151,588 | A | 11/2000 | Tozzoli et al. |
| 6,154,729 | A | 11/2000 | Cannon et al. |
| 6,163,771 | A | 12/2000 | Walker et al. |
| 6,370,573 | B1 | 4/2002 | Bowman-Amuah |
| 6,389,426 | B1 | 5/2002 | Turnbull et al. |
| 6,513,129 | B1 | 1/2003 | Tentij et al. |
| 6,571,285 | B1 | 5/2003 | Groath et al. |
| 6,629,135 | B1 | 9/2003 | Ross, Jr. et al. |
| 6,941,306 | B2 | 9/2005 | Kim |
| 7,370,335 | B1 | 5/2008 | White et al. |
| 7,464,057 | B2 | 12/2008 | Cole et al. |
| 7,818,399 | B1 * | 10/2010 | Ross, Jr. ............ G06Q 30/0274 709/215 |
| 2001/0044840 | A1 | 11/2001 | Carleton |
| 2002/0103905 | A1 | 8/2002 | Subramaniam |
| 2002/0152106 | A1 | 10/2002 | Stoxen et al. |
| 2002/0165936 | A1 | 11/2002 | Alston et al. |
| 2002/0169851 | A1 | 11/2002 | Weathersby et al. |
| 2002/0178213 | A1 | 11/2002 | Parry |
| 2003/0200300 | A1 | 10/2003 | Melchione |
| 2004/0078294 | A1 * | 4/2004 | Rollins ................. G06Q 20/02 705/27.1 |
| 2004/0133460 | A1 | 7/2004 | Berlin et al. |
| 2005/0015481 | A1 | 1/2005 | Blankenship |

OTHER PUBLICATIONS

American Express Enhances Membership B@nking with Free Quicken TurboTax Deluxe, 5.65% APY Money Market Rates, No-Fee Interest Checking, PR Newswire, New York: Feb. 1, 2000. p. 1.
American Express Launches Online Brokerage, PR Newswire, New York: Nov. 8, 1999. p. 1.
AmEx beefs up online investment services, Funds International, London: Nov. 25, 1999. p. 4.
CardSystems and Maverick International Processing Services Merge to Form Next-Generation Application Service Provider, Business Wire, Oct. 5, 1999, p. 0047.
Cultivating customer loyalty.(Gymboree's point-of-sale system)(Company Operations), Communications News, V. 36, No. 6, Jun. 1999, p. 56.
David Essex, "Big dreams for tiny money," Framingham: ComputerWorld, vol. 33, Iss. 50, Dec. 13, 1999, p. 66.
Fearn, et al., "Designing Tivoli Solutions for End-to-End Systems and Service Management," IBM, First Edition, Jun. 1999, 346 pages.
First Data, Netscape Jointly Deliver "First Real-Time On-Line Credit Card Authorisation System," Computergram International, No. 2890, Apr. 11, 1996, 2 pages.
Internet Initiatives Loom Large for Serious Card Marketers, Card Marketing, V. 3, No. 11, Dec. 1999, 8 pages.
Mark Guzdial, et al., "Recognizing and Supporting Roles in CSCW," CSCW '00 Proceedings of the 2000 ACM conference on Computer supported cooperative work, pp. 261-268.
Amy Schatz, "Credit card companies offer special plastic for buying on the Web," Austin American Statesman, Dec. 19, 1999, p. E1.
Sergio Bandinelli, et al., "Supporting Cooperation in the SPADE-1 Environment," IEEE Transactions on Software Engineering, vol. 22, No. 12, Dec. 1996, pp. 841-865.
The American Express Cards, Dec. 24, 1996 web pages from web.archive.org, 4 pages. [Retrieved Sep. 2, 2006].
Hal Lux, "The search for the 'killer app'," Institutional Investor, New York: Apr. 1997, vol. 31, Iss. 4, p. 91.
Richard Bentley, et al., "The World Wide Web as Enabling Technology for CSCW: The Case of BSCW," Computer Supported Cooperative Work: The Journal of Collaborative Computer 6, 1997, pp. 111-134.
John Bowers, et al., "Workflow From Within and Without: Technology and Cooperative Work on the Print Industry Shopfloor," Proceedings of the Fourth European Conference on Computer-Supposed Cooperative Work, Sep. 10-14, 1995, pp. 51-66.
The GM Card, www.gmcard.com/GMCard/index.jsp, 2005, 1 page. [Retrieved Nov. 30, 2005].
The Starbucks Card Duetto Visa, www.starbucks.com/card/duetto. asp, 2005, 1 page. [Retrieved Nov. 30, 2005].

* cited by examiner

TRANSACTION ACCOUNT INTERFACE

The present application is a continuation of U.S. application Ser. No. 11/275,066, filed Dec. 7, 2005, the disclosure of which is incorporated by reference herein in its entirety.

BACKGROUND OF THE INVENTION

Field of the Invention

The present invention generally relates to card acquisition partner interfaces, and more particularly to a system, method and computer program product for an acquisition partner interface for integrating multiple partner channels into a transaction account issuer platform to allow partner customers to apply for transaction accounts.

Related Art

Many transaction account issuers continue to be plagued with slowing market growth, and declining response rates. Account issuers also face new competitors and innovative loyalty programs, while emerging products continue to change the industry landscape. This is due in part to traditional customer acquisition channels experiencing declines in response rates and profitability. In addition, acquisition of new transaction account members takes time to achieve at a time when potential members want their applications processed quickly.

Issuers also must take into account that newer acquisition channels now use the Internet for business-to-business ("B2B") communication, and partner companies expect issuers to provide websites that can be rebranded. In addition, partner companies want their customers to have a seamless purchase experience, in order to complete all potential sales and build loyalty. These partners also are looking for revenue-sharing opportunities.

In light of these challenges, transaction account issuers are constantly searching for opportunities to increase the number of customers holding their transaction accounts and using their financial transaction instruments through cooperative relationships with other companies (herein referred to as "partners"). Attempts to establish connections between these partners and the internal acquisition systems of transaction account issuers have, in the past, resulted in custom-built interfaces for each external partner (sometimes referred to as "point solutions"). These custom built interfaces are not generally reusable across an enterprise. Some partners have attempted to use the transaction account issuer's Internet website. Such websites, however, are not easily rebranded to give the look and feel of the partner company. Nor do they provide customizable data validation and security mechanisms required by certain partners.

A need exists to increase new transaction account member acquisitions by creating distribution channels with partners which allow their customers to have a seamless purchase experience. There is also a need to increase transaction account member engagement by immediately extending credit (or approve debit) to customers (e.g., instant card usage). Yet another need exists to attract new partners with a competitive advantage in instant acquisition.

Given the foregoing, what is needed is a system, method and computer program product for an acquisition partner interface for integrating multiple partner channels into a transaction account issuer platform to allow partner customers to apply for transaction accounts.

BRIEF DESCRIPTION OF THE INVENTION

The present invention meets the above-identified needs by providing a system, method and computer program product for an acquisition partner interface for integrating multiple partner channels into a transaction account issuer platform to allow partner customers to apply for transaction accounts.

In one aspect of the invention, a system, method and computer program product are provided for interfacing disparate partner systems to a transaction account issuer system. A Web server receives a request from one of the disparate partner systems, which may be a Web service, a portal and/or a partner microsite. An application server extracts a partner identifier from the request, and a delegate engine delegates actions corresponding to the request to one or more handlers in accordance with predetermined rules associated with the partner identifier. A worker manager manages worker code blocks, that perform the actions based on a subset of the plurality of predetermined rules associated with the partner identifier. The Web server also communicates to the partner system an outcome based on the actions.

An advantage of the present invention is that it provides multiple technology channels to drive card acquisitions through strategic external partnerships.

Another advantage of the present invention is that it provides multiple options to a transaction account issuer's partners to connect to the transaction account issuer via various channels and differing degrees of desired customization.

Another advantage of the present invention is that it allows card members to be acquired via the partners' telephone, Web and in-person channels.

Yet another advantage of the present invention is that it improves instant approval rates by leveraging partner data where applicable.

Still anther advantage is that the present invention provides instant account usage to all instantly approved applicants.

Another advantage of the present invention is that it provides reporting to monitor service level agreements ("SLAs") at a partner and/or channel level.

Another advantage of the present invention is that it provides a selected range of instant enabled products by partner with minimal development.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

DETAILED DESCRIPTION

I. Overview

Figure 1:
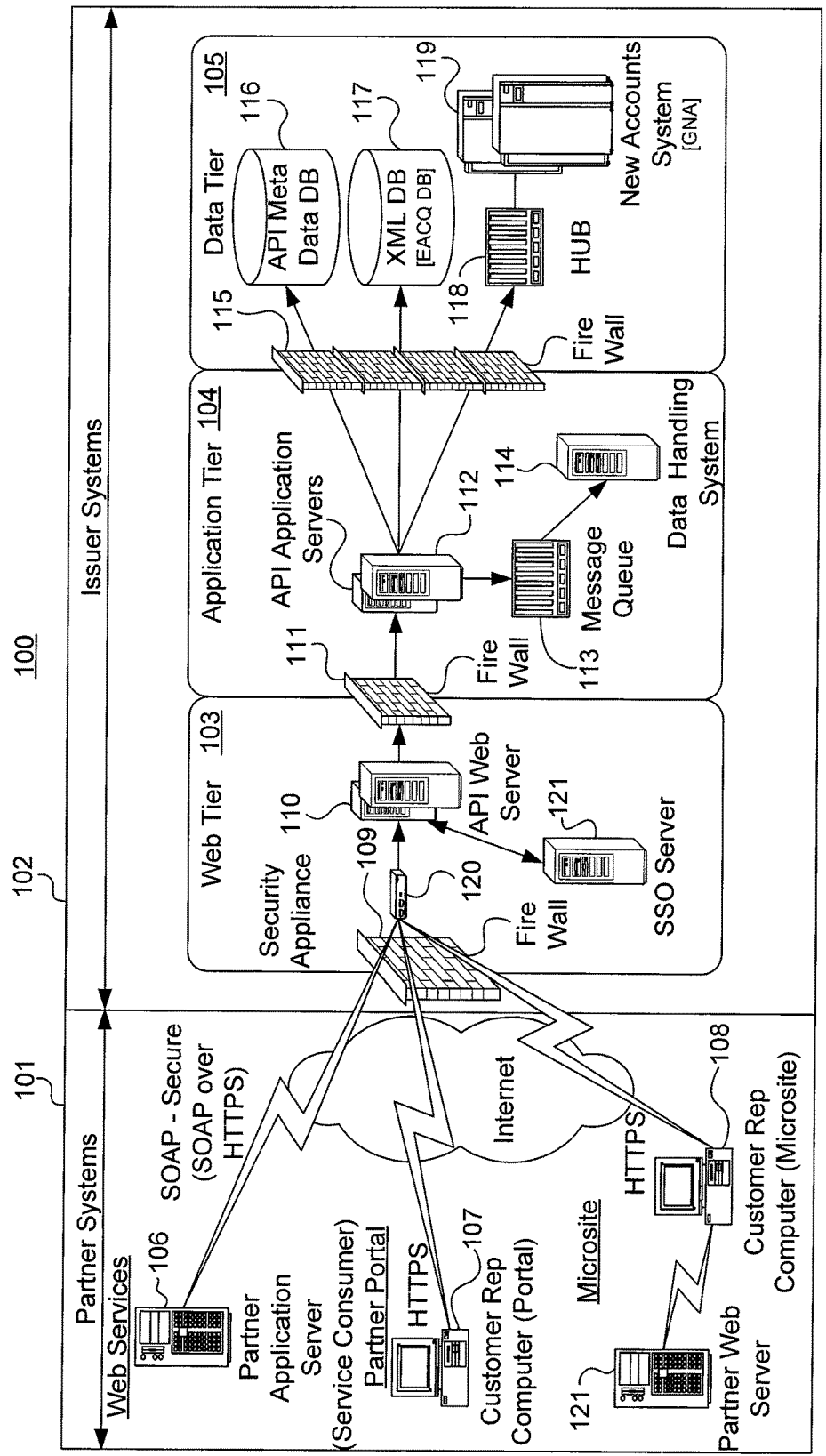
FIG. 1 is a block diagram of an exemplary acquisition partner interface system in which the present invention, in an embodiment, would be implemented.

The present invention is directed to a system, method and computer program product for an acquisition partner interface for integrating multiple partner channels into a transaction account issuer platform to allow partner customers to apply for transaction accounts.

The present invention is now described in more detail herein in terms of an exemplary acquisition partner interface for allowing a partner's customers to apply for a new transaction account through a transaction account issuer's partner. This is for convenience only and is not intended to limit the application of the present invention. In fact, after reading the following description, it will be apparent to one skilled in the relevant art(s) how to implement the following invention in alternative embodiments (e.g., for applying for products and services other than new transaction accounts).

The terms "user," "end user," "consumer," "customer," "participant," and the plural forms of these terms are used interchangeably throughout herein to refer to those persons or entities capable of accessing, using, being affected by and/or benefiting from the tool that the present invention provides for an acquisition partner and transaction account issuer to allow partner customers to apply for transaction accounts.

Furthermore, the terms "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

The terms "Web service," "application service" and the plural forms of these terms are used interchangeable throughout herein to refer to describes a standardized way of integrating Web-based applications using well known open standards such as Extensible Markup Language (XML), Simple Object Access Protocol (SOAP), Web Services Description Language (WSDL), Universal Description Discovery and Integration (UDDI) and the like, over an Internet protocol backbone. XML is used to tag the data, SOAP is used to transfer the data, WSDL is used for describing the services available and UDDI is used for listing what services are available. Used primarily as a means for businesses to communicate with each other and with clients, Web services allow organizations to communicate data without intimate knowledge of each other's systems behind the firewall. Unlike traditional client/server models, such as a Web server/Web page system, Web services do not provide the user with a graphical user interface ("GUI"). Web services instead share business logic, data and processes through a programmatic interface across a network. The Web service can be added to a GUI (such as a Web page or an executable program) to offer specific functionality to users.

The terms "microsite," "minisite" and the plural forms of these terms are used interchangeably throughout herein to refer to a separate page of a website that has a separate URL than its home page and is used to provide information about and/or promote something that is related to the home page.

A "portal" is a website or service that provides access to a number of sources of information and facilities, such as a directory of links to other websites, search engines, email, online shopping, and the like.

A "transaction account" (as the term is used herein) is an account associated with an open account or a closed account system (as described below). The transaction account may exist in a physical or non-physical embodiment. For example, a transaction account may be distributed in non-physical embodiments such as an account number, frequent-flyer account, telephone calling account or the like. Furthermore, a physical embodiment of a transaction account may be distributed as a financial instrument.

A "financial transaction instrument" may be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A financial transaction instrument may also have electronic functionality provided by a network of electronic circuitry that is printed or otherwise incorporated onto or within the transaction instrument (and typically referred to as a "smart card"), or be a fob having a transponder and an RFID reader.

With regard to use of a transaction account, users may communicate with merchants in person (e.g., at the box office), telephonically, or electronically (e.g., from a user computer via the Internet). During the interaction, the merchant may offer goods and/or services to the user. The merchant may also offer the user the option of paying for the goods and/or services using any number of available transaction accounts. Furthermore, the transaction accounts may be used by the merchant as a form of identification of the user. The merchant may have a computing unit implemented in the form of a computer-server, although other implementations are possible.

In general, transaction accounts may be used for transactions between the user and merchant through any suitable communication device, such as, for example, a telephone network, intranet, the global, public Internet, a point of interaction device (e.g., a point of sale (POS) device, personal digital assistant (PDA), mobile telephone, kiosk, etc.), online communications, off-line communications, wireless communications, and/or the like.

An "account," "account number" or "account code", as used herein, may include any device, code, number, letter, symbol, digital certificate, smart chip, digital signal, analog signal, biometric or other identifier/indicia suitably configured to allow a consumer to access, interact with or communicate with a financial transaction system. The account number may optionally be located on or associated with any financial transaction instrument (e.g., a rewards, charge, credit, debit, prepaid, telephone, embossed, smart, magnetic stripe, bar code, transponder or radio frequency card).

The account number may be distributed and stored in any form of plastic, electronic, magnetic, radio frequency (RF), wireless, audio and/or optical device capable of transmitting or downloading data from itself to a second device. A customer account number may be, for example, a sixteen-digit credit card number. Each credit card issuer has its own numbering system, such as the fifteen-digit numbering system used by American Express Company of New York, N.Y. Each issuer's credit card numbers comply with that company's standardized format such that an issuer using a sixteen-digit format will generally use four spaced sets of numbers in the form of:

$N_1N_2N_3N_4N_5N_6N_7N_8N_9N_{10}N_{11}N_{12}N_{13}N_{14}N_{15}N_{16}$

The first five to seven digits are reserved for processing purposes and identify the issuing institution, card type, etc. In this example, the last (sixteenth) digit is typically used as a sum check for the sixteen-digit number. The intermediary eight-to-ten digits are used to uniquely identify the customer, card holder or cardmember.

A merchant account number may be, for example, any number or alpha-numeric characters that identifies a particular merchant for purposes of card acceptance, account reconciliation, reporting and the like.

The present invention provides multiple interface options to a transaction account issuer's partners to be able to connect to back end systems for the purpose of allowing the partner's customers to apply for credit. Having these interface options allow partners to reach and interact with the transaction account issuer's system with limited effort and in some case with no more than a desktop computer connect to the Internet. Each environment has a unique set of benefits.

A first interface type is a Web services option. The Web services option is a Web service hosted by the transaction account issuer which provides an interface to the partner. The partner develops their own form for collecting information and uses the Web service provided by the transaction account issuer for processing the information. A Web services solution is appropriate when the partner wants to own and control the entire customer experience. From the transaction account issuer's perspective, a Web services solution can shorten the application process because in a Web services environment the transaction account application experience is fully integrated with the purchase process (e.g., the ability to pre-fill customer application information). In addition, partners can more easily share data with the transaction account issuer. Moreover, because prescreened information can be used, the Web services environment facilitates increased approval rates and reduces fraud.

A second interface type is a microsite. The microsite option is also in the form of a Web page provided by the transaction account issuer. However, the look and feel of the partner's current website is maintained. The Web page content and functionality is provided by the transaction account issuer, but is formatted and branded to look like the partner's site. The transaction account issuer owns and controls the applications pages, including additional features, such as providing disclosure updates.

A third interface type is a partner portal. The partner portal is a private (URL) hosted by the transaction account issuer. Partner's have the ability to sign into a private website hosted by the transaction account issuer to capture applications and perform instant approval decision making processes and usage functions. In this solution, the partner collects information from its customers and uses the partner portal to key in this information on behalf of the customer. The partner does not own and control the entire customer experience in a partner portal environment. A portal is similar to a microsite in that both the partner portal and microsite environments require minimal development effort for the partner.

II. System

FIG. 1 depicts a block diagram of an exemplary acquisition partner integration system 100 operable to interface partners through a Web services, microsite and/or Web portal channels, which the present invention, in an embodiment, would be implemented.

System 100 is divided into two systems, the partner system 101 and the issuer system 102. In addition, three types of interfaces (i.e., partner channels) are illustrated, the Web services channel, the microsite channel and the portal channel.

System 100 includes a partner application server 106 for hosting a partner site in a Web services channel environment. Partner application server 106 provides a potential customer browsing on the partner site with an offer to subscribe to an issuer's transaction instrument, and if the customer accepts the offer, provides the potential customer with an application form that the applicant completes. Partner application server 106 also verifies the application data and translates it into an XML infoset or Character Large Object (CLOB). In an embodiment, partner application server 106 invokes the transaction account issuer's Web service via SOAP over HyperText Transfer Protocol Secure (HTTPS) and passes the application XML data as a part of the SOAP payload, along with some meta information as a part of the payload.

The incoming SOAP call is intercepted by a security appliance 120 which allows the issuer to securely publish its Web services for its partners. In particular, security appliance 120 analyzes the security block of the SOAP payload. If the certificate exchange and signature verification is successful the message is passed on to the appropriate service end point. In this embodiment, the security appliance 120 is only used with the Web services channel. The microsite and portal channels include a different security feature as will be explained in more detailed below.

In system 100, the service end point is an acquisition partner interface (API) application server 112 for hosting the Web service. The SOAP payload includes a partner identifier. API application server 112 extracts the partner identifier and compares it with corresponding information stored in its own data repository, API meta data database 116, and identifies the partner privileges (e.g., which issuer products or services a partner is permitted to promote). Once the partner is verified, application server 112 unloads the application XML data from the SOAP payload and validates it to check for data consistency.

System 100 further includes a data handling system 114 connected through a message queue 113. As a part of the validation, an address provided by the customer is verified with an address lookup service provided by data handling system 114.

API application server 112 also stores the XML application data on XML database 117 and generates a unique identifier to identify each transaction account application.

Application server 112 also invokes a handler routine which passes the XML application data, through a hub 118, to a new accounts acquisition system 119 which makes decisions such as to approve, reject, counteroffer the terms of a transaction account application.

System 100 further includes a partner Web server 121 for hosting a microsite. While on the partner's website through a customer representative computer 108 the customer (or customer representative) can switch to the transaction account issuer's URL and connect to a page hosted by the transaction account issuer via HTTPS. Once connected to the issuer's system through API Web server 110, the customer is provided with one or more offers (e.g., card product options). If an offer is accepted, upon product selection an application form is provided for the applicant to fill out. Once the application form information is verified by partner Web server 121, the application data are submitted to the issuer system API application server 112 for processing. Partner information also is communicated as part of the request along with a return URL. API application server 112 verifies a partner identifier with corresponding information stored in its own data repository, API meta data database 116, and identifies the partner privileges (e.g., which issuer products a partner is permitted to promote). In addition, API application server 112 validates the XML data to check for data consistency. In addition to this data consistency validation other validations are performed. For example, the address provided by the customer is compared to data stored in data handling system 114.

As described above, application server 112 also communicates the application XML data to XML database 117 for storage and generates a unique identifier for identifying each card application. Application server 112 also invokes a handler routine which passes the application XML data to a new accounts acquisition system 119 through the hub 112. New accounts acquisition server 119 is used to make decisions such as to approve, reject, counteroffer the terms of an application for credit.

System 100 further includes a customer representative desktop 107 which is in communication with API Web server 110 through a portal via HTTPS. A potential customer shopping at a partner store or by telephone with a telemarketing partner accepts an offer for subscribing for the issuer's transaction account (or more particularly to a transaction instrument product). The partner logs onto the issuer's Web server from customer representative computer 107 computer and is authenticated (e.g., via a secure sign-on (SSO) protocol) through SSO server 121.

Upon successful logon, application server 112 verifies with its own data repository, API meta data database 116 and identifies the partner privileges. Based on partner privileges stored on API meta data database 116 and product selection, an application form is communicated to customer representative computer 107 which the partner completes, verifies and submits for processing on behalf of the customer.

Several security features are integrated into system 100. All points of entry into the issuer's internal system are protected through firewalls 109, 111 and 115. In addition, all content and sensitive data are stored in a trusted domain of the issuer's internal system. Confidential data are encrypted over open networks using well known encryption techniques (e.g., 128 bit secure socket layer or SSL).

III. Process

Figure 2:
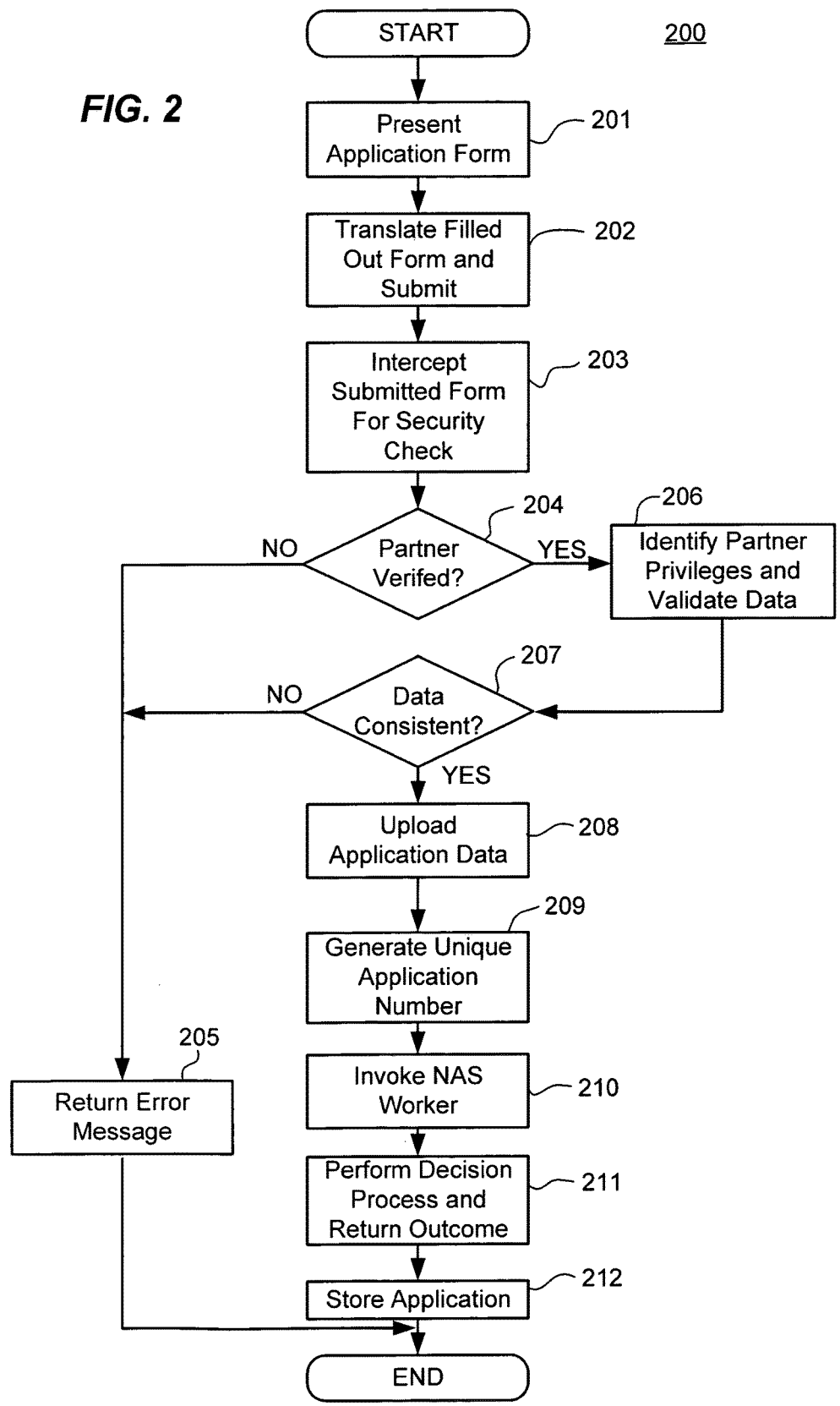
FIG. 2 is a flowchart illustrating a partner acquisition process according to one embodiment of the present invention.

Referring to FIG. 2, a flowchart illustrating a multi-channel acquisition partner interface process 200, according to one embodiment of the present invention, is shown.

Process 200 begins at step 201, when a user browsing on a partner site connects to a Web page hosting an application form for subscribing to an issuer's product (e.g., transaction instrument or services). In the case of the Web services channel, as described above, the Web page is hosted on partner application server 106. In the case of the microsite channel, the Web page is provided by API Web server 110 through partner Web server 121. And, in the case of the partner portal channel, the Web page is hosted on API Web server 110. In all three partner channel environments, the user completes the application form and the data is verified and submitted for processing.

As explained above, information for identifying the partner is communicated to API application server 112. This information can be aggregated with the form data supplied by an applicant delivered separately or embedded within the URL. The applicant data includes information such as name, address, date of birth, mother's maiden name, telephone number, security password and the like.

At step 202 the application data is translated into an XML data file and submitted to issuer system 102 over HTTPS. The received data is intercepted for a security check at step 203. If the data passes the security check, it is forwarded to application server 112. API application server 112 extracts the partners unique identifier and verifies it by comparing it to the issuer's system 102 own data repository within the data handling system (e.g., API Meta Data database 116) as shown at step 204. If verified, API application server 112 also identifies the partner privileges and validates the data for consistency at step 206. If the partner is not verified, at step 205 an appropriate error message is communicated back to user.

If a determination is made at step 207 that the application data is consistent by both the partner application server 106, as well as the API application server 112 the XML application data is uploaded to XML database 117, as shown at step 208. As mentioned above, as a part of this validation, the address provided by the customer also is verified by data handling system 114. Next, a unique application number is generated at step 209. At step 211, API application server 112 passes the XML application data to a new accounts server 119 to open and activate an account for processing the application, which decides whether the application should be approved, denied, or whether another offer should be made. More particularly, new accounts server 119 performs the decision process at step 211 based on rules which evaluate the results of an applicant's credit score and other application data as will be appreciated by one skilled in the relevant art(s) after reading the description herein. If a transaction instrument is being applied for, card number is assigned and the pertinent account information is communicated to the site where the application originated. Similarly, if other products or services are being applied for, corresponding outcomes are returned to the site where the application originated. In addition, the application is finalized, locked and archived for predetermined time in a database within the issuer's internal system 102 (e.g., XML database 117) as shown at step 212.

The present invention allows multiple channels to communicate with issuer system based on rules set up for each partner. These rules describe the partner's particular acquisition channel type (e.g., Web service, microsite, portal, etc.) and associate relevant partner information. In addition, by centralizing the data flow through API application server 112, the present invention reduces the issuer's system complexity while improving application processing speed and the user's overall experience. In addition to having specific rules for individual partners, other rules can be reused among certain partners, thereby providing consistency.

Figure 3:
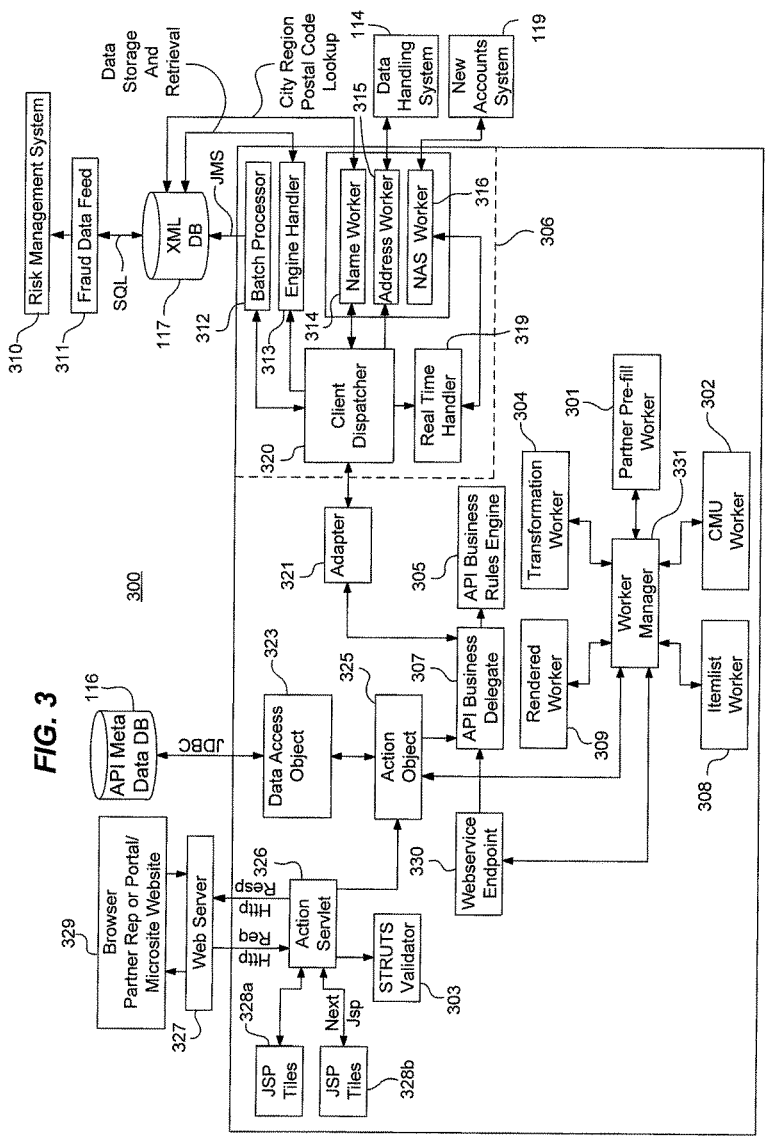
FIG. 3 depicts a logical flow in an acquisition partner interface system according to one embodiment of the present invention.

FIG. 3 depicts a logical flow 300 in an acquisition partner interface system, according to one embodiment of the present invention, illustrating the use and reuse of code blocks, rules, components, handlers and the like. Action servlet 326 is executed by API application server 112 to handle requests and responses between the partner or issuer's Web server 110 or 121 (both of which are depicted in FIG. 3 as Web server 327) and the end user's terminal. In one embodiment, action server 325 is written based on an open framework for building Java-based Web applications called STRUTS, described at http://struts.apache.org. Action servlet 326 manages the actions performed on the Web pages shown on the partner system 101 by sending back appropriate Java Server Page (JSP) tiles 328a and 328b which make up the page or pages displayed through a browser 329 at the partner's terminal computer (e.g., customer representative computer 107 and 108) or through a GUI operated by partner application server 106. The JSP tiles can be reused or defined for use only for a particular partner. As new pages are generated (e.g., new partners added), additional JSP tiles are created, if necessary. As a user inputs data into a form it is validated using a STRUTS validator 303.

Servlet 326 also communicates action requests to an action object 325 which is a routing that handles the request by submitting it to the appropriate component within the issuer system 102. For example, if the STRUTS validator 303 requests validation of a partner's identification, action servlet 326 forms a corresponding action request and sends it to action object 325, which in turn verifies the partner's identification against one stored in API Meta Data database 116. Access between API Meta Data database 116 and action object 325 are through data access object 323.

Business rules are stored in API business rules engine 305 which is handled by API business delegate 307. These rules provide a set of operations to be performed in accordance with the data received from partner system 101. A business rule can be used to decide whether the data satisfies a constraint. For instance, if the partner is in Florida, API business delegate 307 locates the relevant rules stored in API business rules engine 305 and determines whether any constraints on the partnership exist based on the fact that the transaction has been initiated in Florida.

If all the validation requests are successful, an electronic acquisition (EACQ) system 306 is called to communicate the validated data to the issuer's downstream processing systems. An exemplary embodiment of the EACQ system is described in commonly-owned U.S. application Ser. No. 10/718,004, entitled Electronic Acquisition System and Method Using a Portal to Facilitate Data Validation and to Provide A Universal Client Interface, filed on Nov. 20, 2003, which is hereby incorporated by reference.

Worker manager 331 is a routine that manages several code blocks referred to as "workers". Action object 325 communicates requests for data to worker manager 331. Worker manager 331, in turn, manages the worker blocks of code which contain or have access to the corresponding responses. Content management utility (CMU) worker 302, for instance, retrieves data from a content management depository which contains static contents to be displayed on Web pages (e.g., partner logo). Partner pre-fill worker 301 provides pre-fill functionality if the pre-fill data is available from the partner (e.g., applicant's name, address, telephone number, and the like). Transformation worker 304 transforms the application XML data to an internal format used by issuer system 102. Itemlist worker 308 receives and transmits the contents of drop boxes to the user interface (e.g., browser, partner representative computer connected through portal, microsite, 329). Rendered worker 309 builds an HTML/XML block for the client, which can be rendered or shown in a browser/client screen.

Webservice endpoint 330 is the entry point into the API webservice application 112, for the components running on the partner application server 106, which require to use the issuer services Adapter 321 insulates the core application logic from the EACQ system 306. Insulating the EACQ system 306 allows it to be a modular component of system 100. This modularity provides scalability for the architecture. EACQ system 306 provides a set of common services needed to validate the XML data as well as communicate with the new accounts system 119. EACQ system 306 includes a client dispatcher 320, which coordinates the invocation of a service and helps share workers across concurrent requests coming into the issuer system 100. EAQC system 306 includes a collection of utility workers such as a name worker 315 which matches the name on the request against a list of famous names to whet out fraudulent application, an Address worker 315 which is used to verify whether an address is correct, an NAS worker 316 which facilitates connections to the new accounts system 119, a real time handler 319, which allows the issuer system to request for instant processing. Apart from the workers mentioned the EACQ system 306 also includes an engine handler which takes the information passed from a partner system's browser and stores it in the XML database 117, a batch processor 312 that runs a batch process which retrieves data at predetermined times and communicates the data to the new accounts system 119 for processing. Risk management system 310 receives information from XML database 117 through fraud datafeed 311, and processes the information to detect the occurrence of any intentional deception.

IV. Example Implementations

Figure 4:
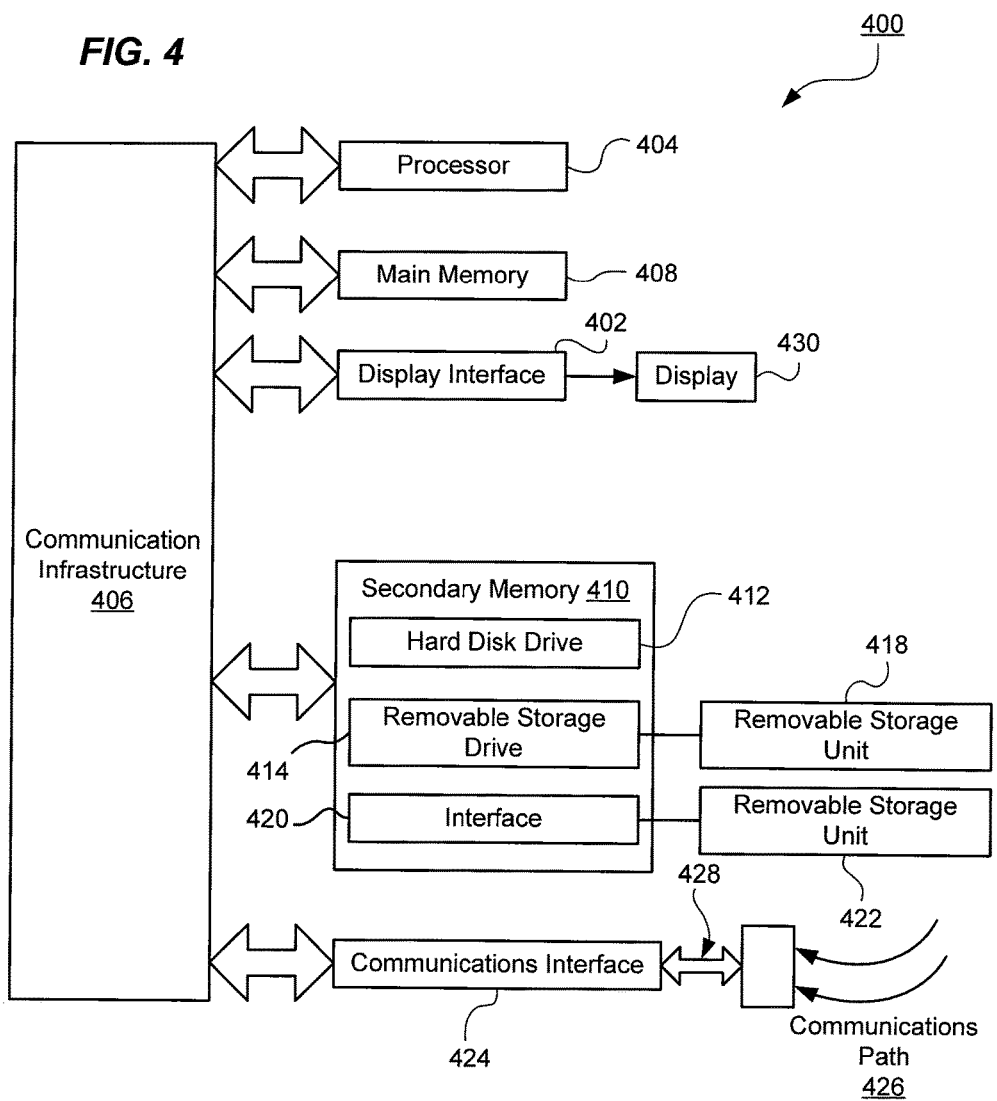
FIG. 4 is a block diagram of an exemplary computer system useful for implementing the present invention.

The present invention (i.e., system 100, process 200, logical flow 300 or any part(s) or function(s) thereof) may be implemented using hardware, software or a combination thereof and may be implemented in one or more computer systems or other processing systems. Useful machines for performing the operation of the present invention include general purpose digital computers or similar devices. In fact, in one embodiment, the invention is directed toward one or more computer systems capable of carrying out the functionality described herein. An example of a computer system 400 is shown in FIG. 4.

The computer system 400 includes one or more processors, such as processor 404. The processor 404 is connected to a communication infrastructure 406 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 400 can include a display interface 402 that forwards graphics, text, and other data from the communication infrastructure 406 (or from a frame buffer not shown) for display on the display unit 430.

Computer system 400 also includes a main memory 408, preferably random access memory (RAM), and may also include a secondary memory 410. The secondary memory 410 may include, for example, a hard disk drive 412 and/or a removable storage drive 414, representing a floppy disk drive, a magnetic tape drive, an optical disk drive, etc. The removable storage drive 414 reads from and/or writes to a removable storage unit 418 in a well known manner. Removable storage unit 418 represents a floppy disk, magnetic tape, optical disk, etc. which is read by and written to by removable storage drive 414. As will be appreciated, the removable storage unit 418 includes a computer usable storage medium having stored therein computer software and/or data.

In alternative embodiments, secondary memory 410 may include other similar devices for allowing computer programs or other instructions to be loaded into computer system 400. Such devices may include, for example, a removable storage unit 422 and an interface 420. Examples of such may include a program cartridge and cartridge interface (such as that found in video game devices), a removable memory chip (such as an erasable programmable read only memory (EPROM), or programmable read only memory (PROM)) and associated socket, and other removable storage units 422 and interfaces 420, which allow software and data to be transferred from the removable storage unit 422 to computer system 400.

Computer system 400 may also include a communications interface 424. Communications interface 424 allows software and data to be transferred between computer system 400 and external devices. Examples of communications interface 424 may include a modem, a network interface (such as an Ethernet card), a communications port, a Personal Computer Memory Card International Association (PCMCIA) slot and card, etc. Software and data transferred via communications interface 424 are in the form of signals 428 which may be electronic, electromagnetic, optical or other signals capable of being received by communications interface 424. These signals 428 are provided to communications interface 424 via a communications path (e.g., channel) 426. This channel 426 carries signals 428 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 414, a hard disk installed in hard disk drive 412, and signals 428. These computer program products provide software to computer system 400. The invention is directed to such computer program products.

Computer programs (also referred to as computer control logic) are stored in main memory 408 and/or secondary memory 410. Computer programs may also be received via communications interface 424. Such computer programs, when executed, enable the computer system 400 to perform the features of the present invention, as discussed herein. In particular, the computer programs, when executed, enable the processor 404 to perform the features of the present invention. Accordingly, such computer programs represent controllers of the computer system 400.

In an embodiment where the invention is implemented using software, the software may be stored in a computer program product and loaded into computer system 400 using removable storage drive 414, hard drive 412 or communications interface 424. The control logic (software), when executed by the processor 404, causes the processor 404 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

V. Conclusion

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

What is claimed is:

1. A method, comprising:
receiving, by a computing system, requests to establish transaction accounts at a computing system, wherein the requests are associated with respective different partner entities of a plurality of partner entities, wherein the requests have different formats, wherein a first request is received via a web service provided by a partner application server that communicates the first request to the computing system using a predefined application programming interface (API), and wherein a second request is received based on user access to a microsite provided by the computing system in response to a partner web server redirecting a user to an address of the computing system and indicating a return address of the partner web server, wherein the microsite is formatted to match a site of a corresponding partner entity;
storing, by the computing system, web content for respective ones of the plurality of partner entities;
receiving, for each of the first and second requests, an identifier of the partner entity associated with the respective request;
invoking, by the computing system in response to each of the first and second requests, a same particular code block to perform an action for the respective request, wherein the action includes retrieving and providing web content to be displayed to a customer of the respective partner entity associated with the request based on the identifier of the respective partner entity, wherein the web content identifies the respective partner entity and is formatted and branded to maintain the look and feel of a website of the partner entity; and
generating and transmitting authorization responses for the first and second requests, wherein at least one of the authorization responses authorizes establishment of a transaction account and includes account information for the authorized transaction account.

2. The method of claim 1, wherein the web content includes a logo of the respective partner entity.

3. The method of claim 1, wherein the particular code block is invoked by a handler.

4. The method of claim 1, wherein the at least one of the requests includes pre-fill data from one of the plurality of partner entities, and wherein the action includes inserting the pre-fill data into the web content.

5. A system, comprising:
one or more processors; and
one or more memories having program instructions stored thereon that are executable by the one or more processors to cause the system to perform operations comprising:

maintaining web content for respective ones of a plurality of partner entities;

transmitting web content to be displayed to a user associated with respective partner entities of the plurality of partner entities, wherein the web content identifies the respective partner entity and is formatted and branded to maintain the look and feel of a website of the partner entity, wherein the transmitting includes transmitting first web content via a web service provided by a partner application server that communicates requests to the system using a predefined application programming interface (API), and transmitting second web content via a microsite provided by the system in response to a redirect from a partner web server to an address of the system, wherein the microsite is formatted to match a site of a corresponding partner entity;

receiving a first request via the web service provided by a partner application server that communicates the first request to the system using a predefined application programming interface (API) and a second request that is received based on user access to the microsite, wherein the first and second requests are from the users to establish transaction accounts;

receiving, for each of the first and second requests, an identifier of the partner entity associated with the respective request;

invoking a same particular code block to generate authorization decisions for the respective first and second requests based on the identifier of the respective partner entity; and transmitting the authorization decisions to the users via the microsite and the web service.

6. The system of claim 5, wherein operations further comprise using at least one of an action servlet and a worker manager to invoke the particular code block.

7. A non-transitory computer-readable medium having instructions stored thereon that are executable by a computing device to perform operations comprising:

receiving requests to establish transaction accounts from a plurality of customers of respective partner entities of a plurality of partner entities, wherein the requests have different formats, wherein a first request is received via a web service provided by a partner application server that communicates the first request to the computing device using a predefined application programming interface (API), and wherein a second request is received based on user access to a microsite provided by the computing device in response to a partner web server redirecting a user to an address of the computing device and indicating a return address of the partner web server, wherein the microsite is formatted to match a site of a corresponding partner entity;

maintaining web content for respective ones of the plurality of partner entities; and receiving, for each of the first and second requests, an identifier of the partner entity associated with the respective request;

generating, in response to each of the first and second requests, web content to be displayed to ones of the customers based on the identifier of the partner entity, wherein the web content identifies the respective partner and is formatted and branded to maintain the look and feel of a website of the partner entity; and generating and transmitting authorization responses for the first and second requests, wherein at least one of the authorization responses authorizes establishment of a transaction account and includes account information for the authorized transaction account.

8. The non-transitory computer-readable medium of claim 7, wherein the requests include information provided by the customers.

9. The non-transitory computer-readable medium of claim 7, wherein the requests include customer information pre-filled by the respective partner entity.

10. The non-transitory computer-readable medium of claim 7, wherein the operations further comprise authenticating the requests.

* * * * *